(No Model.) 2 Sheets—Sheet 1.
W. H. GRAHAM & G. R. McDONALD.
WHEEL LOCKING DEVICE FOR BABY CARRIAGES.
No. 444,432. Patented Jan. 13, 1891.
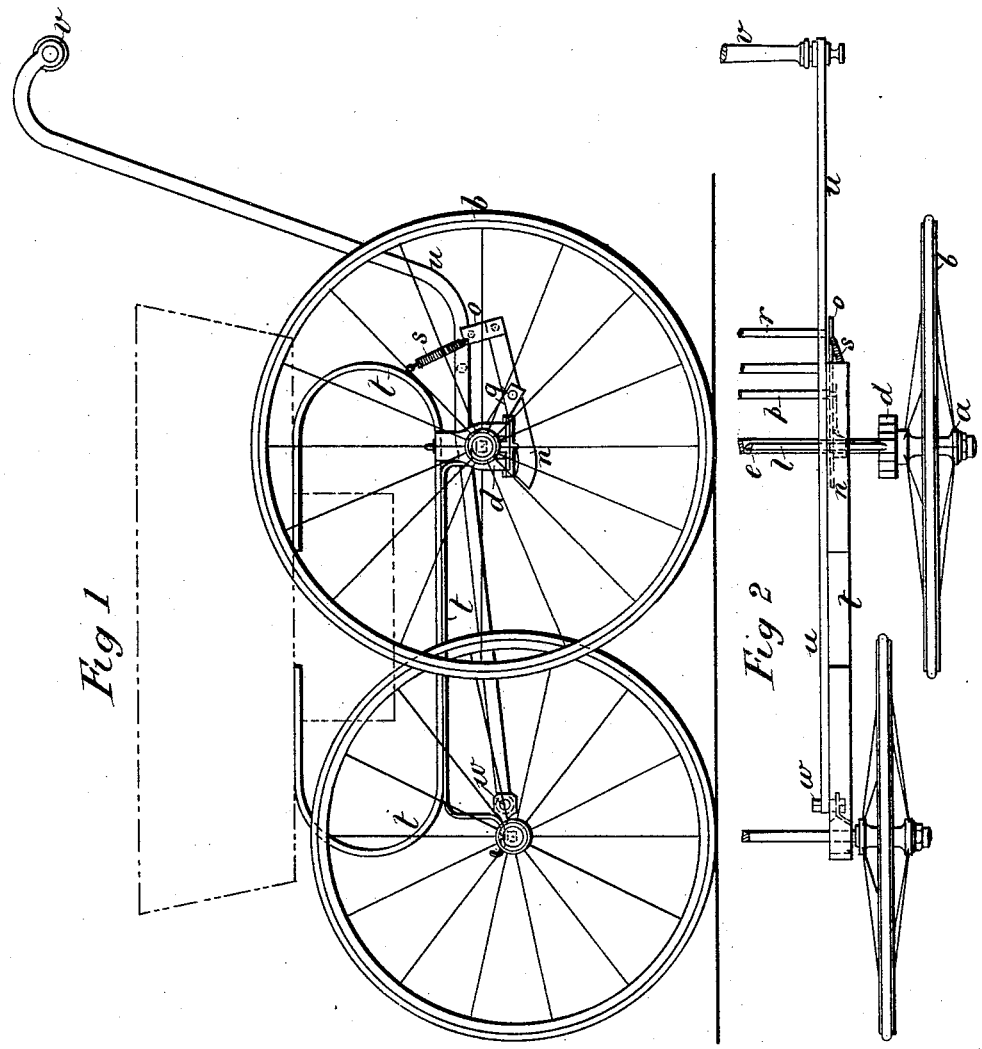
Witnesses:
C. F. Belt
F. A. Hoskins
Inventors.
W. H. Graham, and
G. R. McDonald.
by Herbert W. T. Jenner.
Attorney.

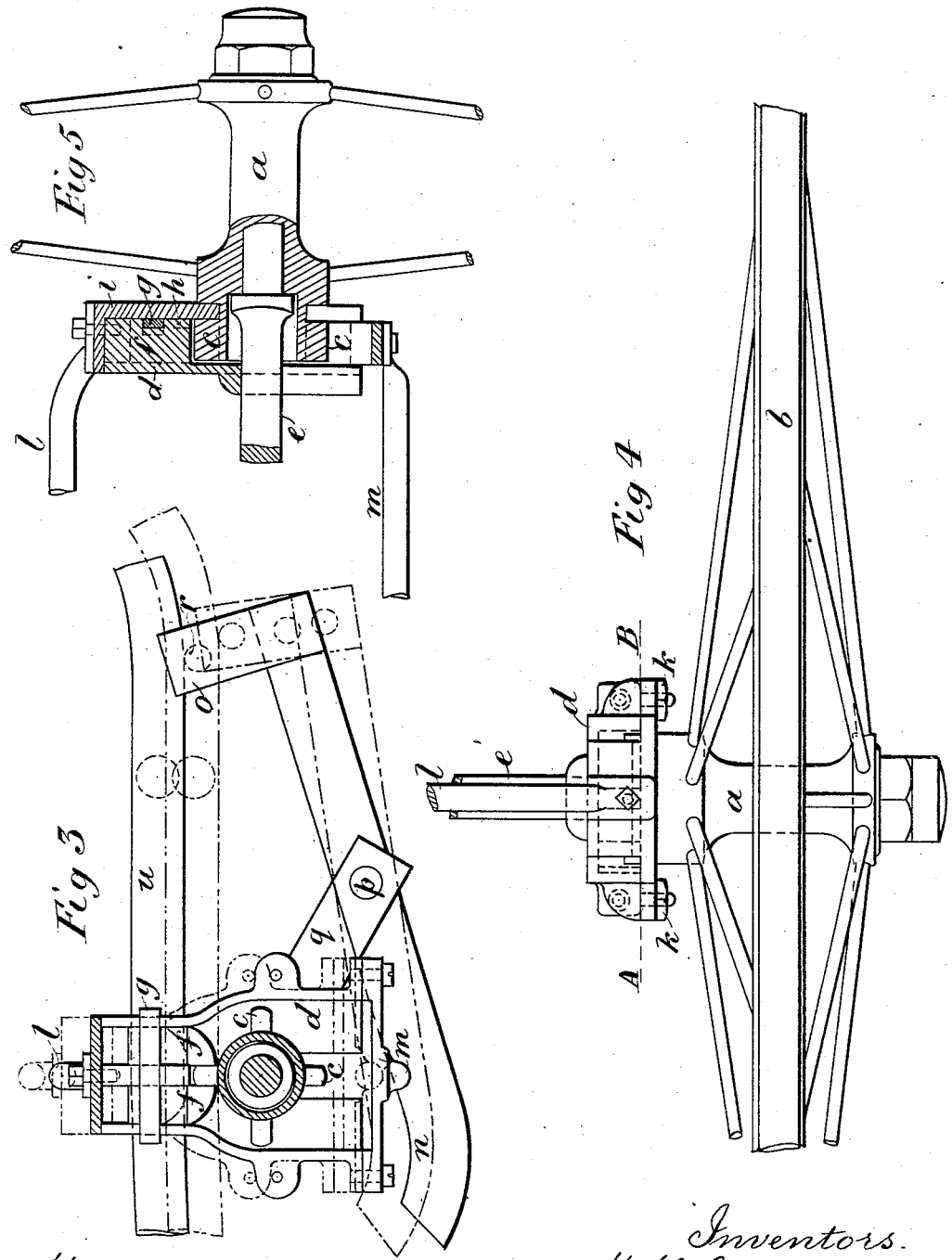

UNITED STATES PATENT OFFICE.

WILLIAM HIGFORD GRAHAM AND GEORGE RODNEY McDONALD, OF LONDON, COUNTY OF MIDDLESEX, ENGLAND.

WHEEL-LOCKING DEVICE FOR BABY-CARRIAGES.

SPECIFICATION forming part of Letters Patent No. 444,432, dated January 13, 1891.

Application filed May 31, 1890. Serial No. 353,712. (No model.) Patented in England April 30, 1888, No. 6,384; in France March 7, 1889, No. 196,532, and in Belgium March 7, 1889, No. 63,672.

*To all whom it may concern:*

Be it known that we, WILLIAM HIGFORD GRAHAM and GEORGE RODNEY MCDONALD, manufacturers, subjects of the Queen of Great Britain, and both of 26 Lambs Conduit Street, in the county of Middlesex, England, have invented certain new and useful Improvements in an Automatic Wheel-Locking Device Applicable to Perambulators and other Similar Wheeled Vehicles; and we do hereby declare the following to be a full, clear, and exact description of the invention, such as will enable others skilled in the art to which it appertains to make and use the same.

Letters Patent for this invention have been obtained in the following countries: Great Britain, No. 6,384, April 30, 1888; France, No. 196,532, March 7, 1889, and Belgium, No. 63,672, March 7, 1889.

This invention has for its object to provide a locking device which shall automatically lock the wheels of perambulators and other similar wheeled vehicles when the pressure of the hands is removed from the driving-handle, the said device being conversely released from the wheels when the driving-handle is depressed, as is the case when the vehicle is being propelled under ordinary circumstances; and it consists, essentially, in the employment of clutch-boxes specially constructed to engage with lobes or teeth on the hind-wheel centers, the said clutch-boxes and teeth being connected and disconnected by suitable mechanism, according as the driving-handle of the vehicle occupies an elevated or depressed position.

In the accompanying two sheets of illustrative drawings, Figure 1 represents a side elevation of the wheels and under-frame of a perambulator with an automatic wheel-locking device constructed according to this invention, and Fig. 2 is a half plan of the same. Fig. 3 represents in detail to enlarged scale a section through A B, Fig. 4, and showing the interior of the clutch-box with disconnecting-gear. Fig. 4 is a plan, and Fig. 5 is a cross-section, of the same.

The centers or hubs $a$ of the hind or trailing wheels $b$ are prolonged, and on the extremity of each said prolongations are formed lobes or teeth $c$, preferably four in number and free to rotate inside a hollow clutch-box $d$, capable of being elevated or depressed relatively to the axle $e$ and the wheel-center $a$, and in the upper part are arranged two pawls or bolts $f$, free to slide in a vertical direction to a certain extent limited by the cross-bar $g$, working in the recesses $h$, so that when the clutch-box is lowered the said bolts engage with one of the teeth $c$ on the wheel-center $a$ and lock the wheel, the vertical play or freedom of the pawls allowing a tooth in its rotation to displace the pawl immediately before it and strike or abut against the second pawl, the first one then falling into its normal position and behind the tooth, which is thus effectually locked, as will be clearly seen. When, however, the clutch-box is raised, the pawls are elevated with it and so disengaged from the tooth.

The clutch-box casings are constructed in halves $d$ $i$, secured together by the nuts $k$, and the clutch-boxes are held securely together by means of two distance-rods $l$ $m$, fastened to their tops and bottoms, as clearly shown. The bottom distance-rod $m$ works in notches in the ends $n$ of two levers fulcrumed at their central parts $p$ on a bracket $q$, secured to the axle $e$, their other ends $o$ being joined by a cross-rod $r$, which is drawn in an upward direction by means of springs connected to the main frame $t$ of the vehicle. Resting on this cross-rod $r$ are the two rods $u$ from the driving-handle $v$, which rods are carried down the back and underneath the vehicle to its front part and hinged to the frame at $w$, thus forming a long bent double lever.

The dotted and full lines on Fig. 3 show the relative positions of the various parts when the driving-handle is in its depressed and elevated positions respectively.

What we claim as our invention, and desire to secure by Letters Patent, is—

1. In perambulators and other similar wheeled vehicles, a wheel-locking device comprising a clutch-box in which are two sliding pawls for engaging with lobes or teeth forming part of or connected to the wheel-center, and operated from the driving-handle in such a manner that when the said handle is depressed the clutch-box is elevated and the sliding pawls disengage from the lobe-wheel, thus leaving the vehicle-wheels free to rotate, but when the hands are removed from the driving-handle the sliding pawls engage with one lobe of the said lobe-wheel, and thereby effectually lock the said vehicle-wheels, substantially as described.

2. The combination, with a child's carriage, of the bent handle-rods pivoted to the front part of the frame, a toothed clutch-wheel secured to one of the carriage-wheels, and a spring-actuated stop device normally engaging with the said clutch-wheel and operatively connected with the handle-rods between the handle and the rod-pivots, whereby the axle may be released when the handle is depressed, substantially as set forth.

3. The combination, with a child's carriage, of the bent handle-rods pivoted to the front part of the frame, the toothed clutch-wheels secured to the carriage-wheels, the vertically-sliding clutch-boxes provided with pawls for engaging with the said clutch-wheels, the distance-rods connecting the clutch-boxes, the levers $n$, pivoted to brackets projecting from the axle and provided with the rod $r$ for the handle-rods to rest on, and a spring normally holding the said clutch-boxes in their lower position, substantially as and for the purpose set forth.

In testimony whereof we have affixed our signatures in presence of two witnesses.

WILLIAM HIGFORD GRAHAM.
GEORGE RODNEY McDONALD.

Witnesses:
G. F. WARREN,
*Notary Public, London.*
T. F. BARNES,
28 *Southampton Buildings, London, W. C.*